July 31, 1945.  J. DE LA CIERVA  2,380,582
AIRCRAFT HAVING ROTATIVE WINGS
Filed Nov. 16, 1933   9 Sheets-Sheet 1

INVENTOR
Juan de la Cierva
BY Sumestvedt + Lechner
ATTORNEYS

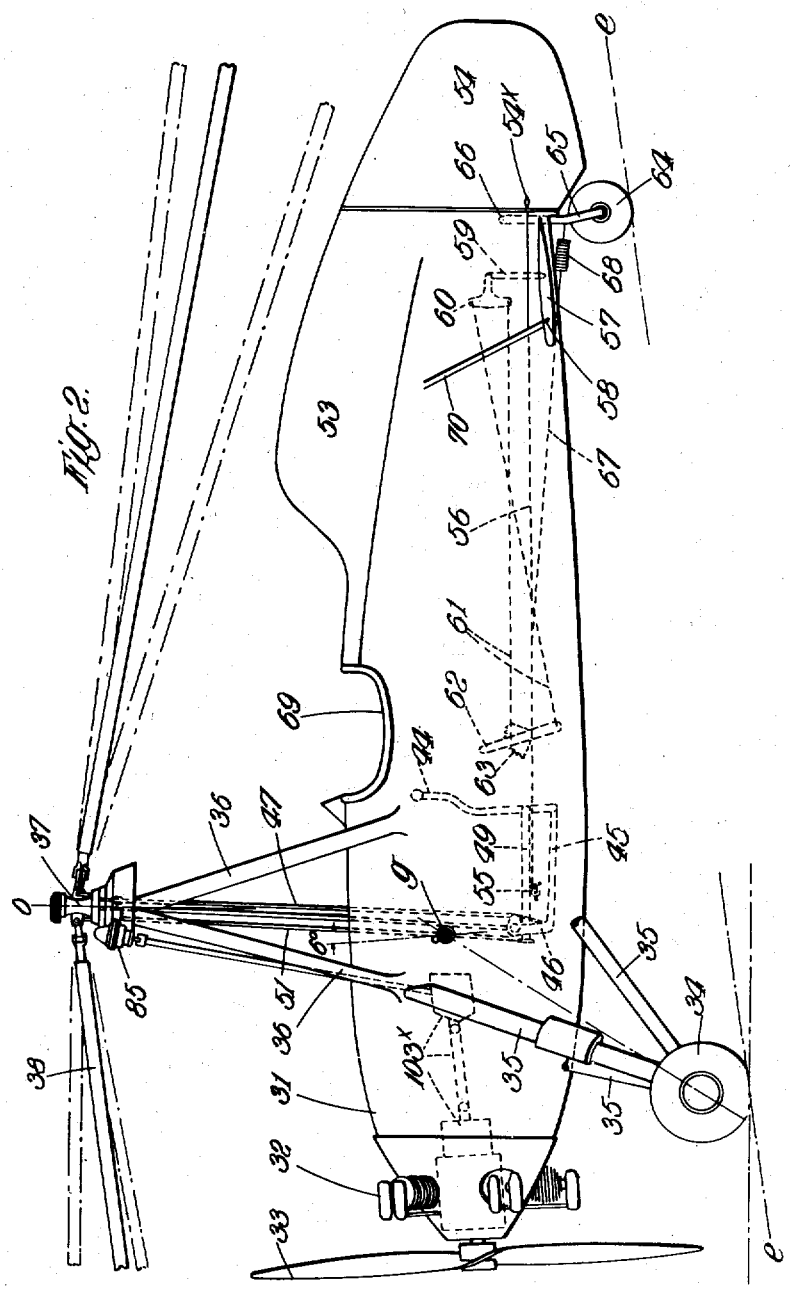

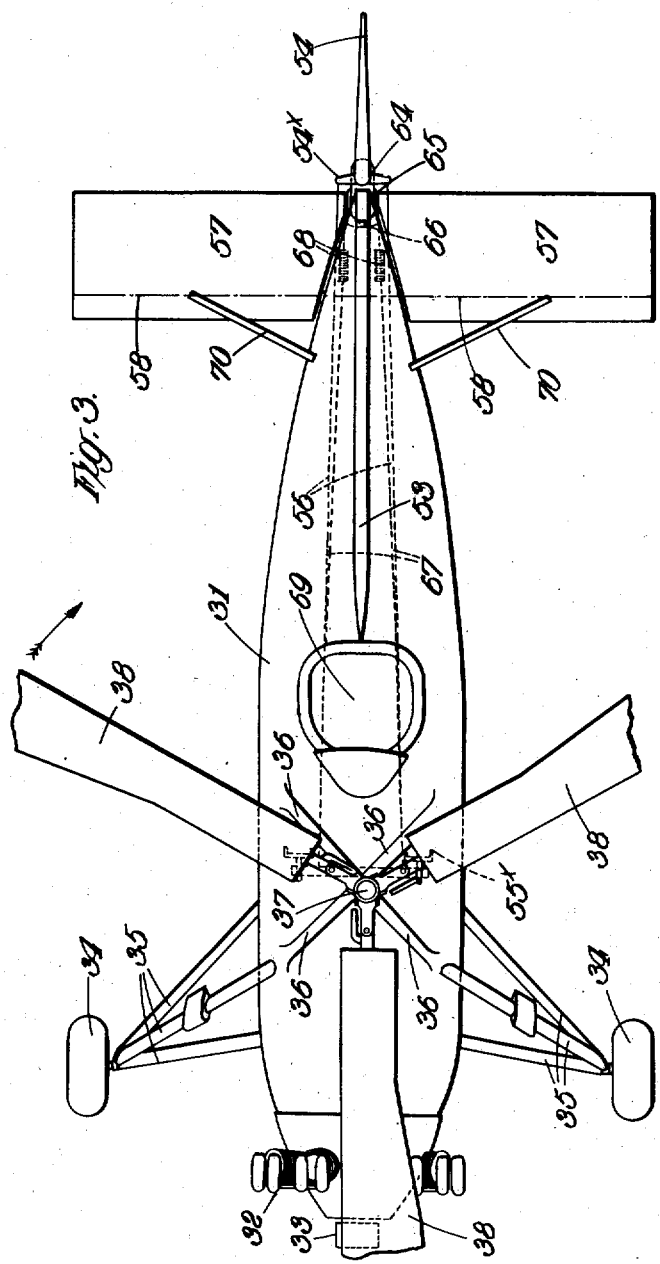

July 31, 1945.    J. DE LA CIERVA    2,380,582
AIRCRAFT HAVING ROTATIVE WINGS
Filed Nov. 16, 1933    9 Sheets-Sheet 4

INVENTOR
Juan de la Cierva
BY
Symmestvedt + Lechner
ATTORNEYS

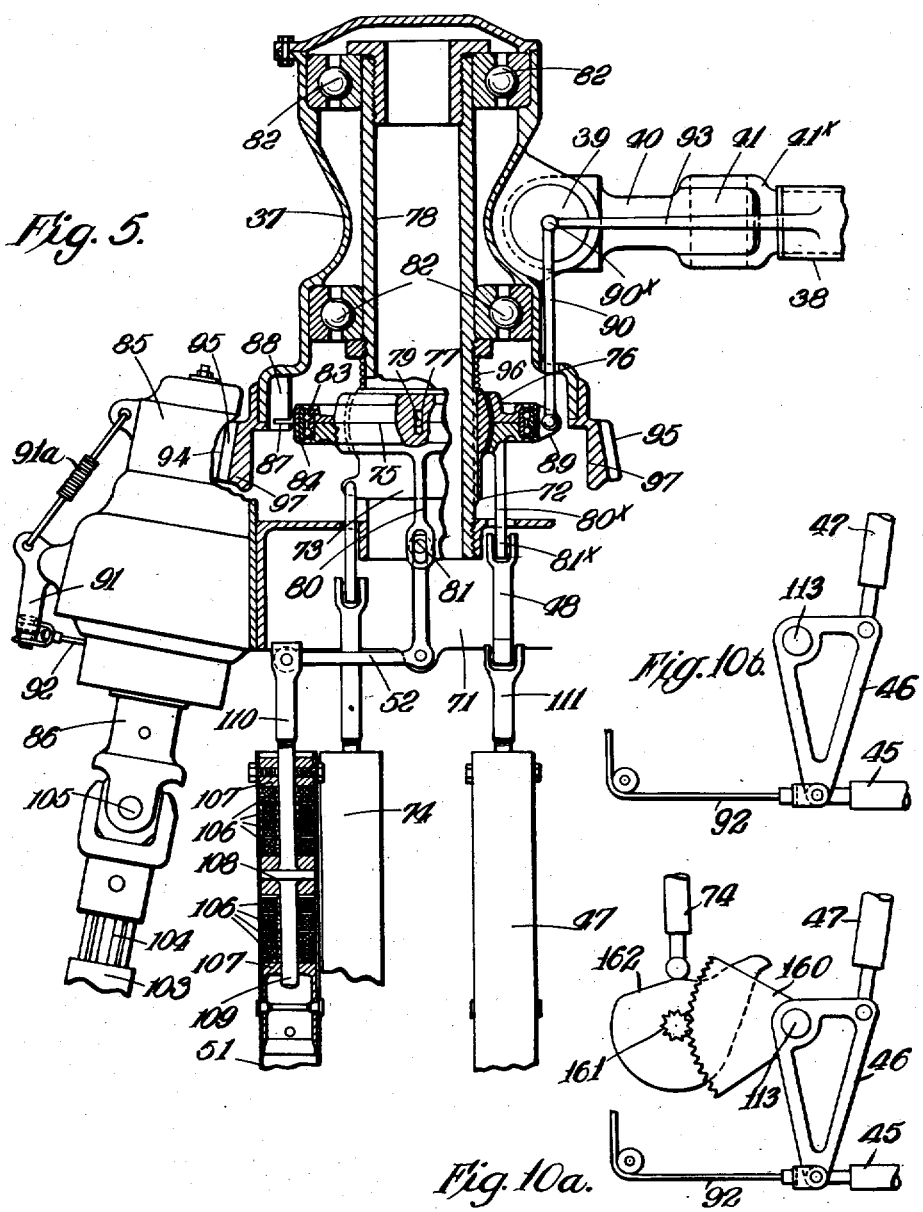

July 31, 1945.  J. DE LA CIERVA  2,380,582
AIRCRAFT HAVING ROTATIVE WINGS
Filed Nov. 16, 1933  9 Sheets-Sheet 6
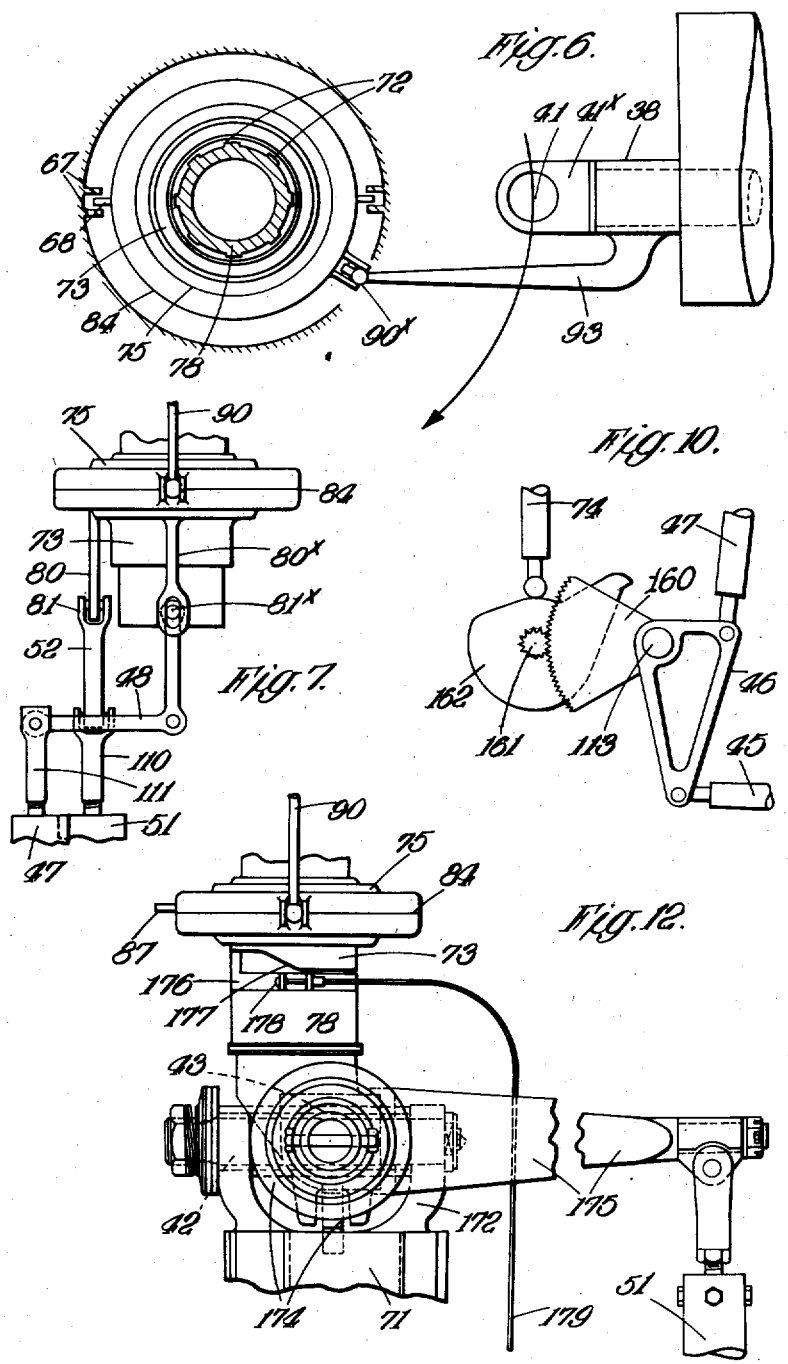

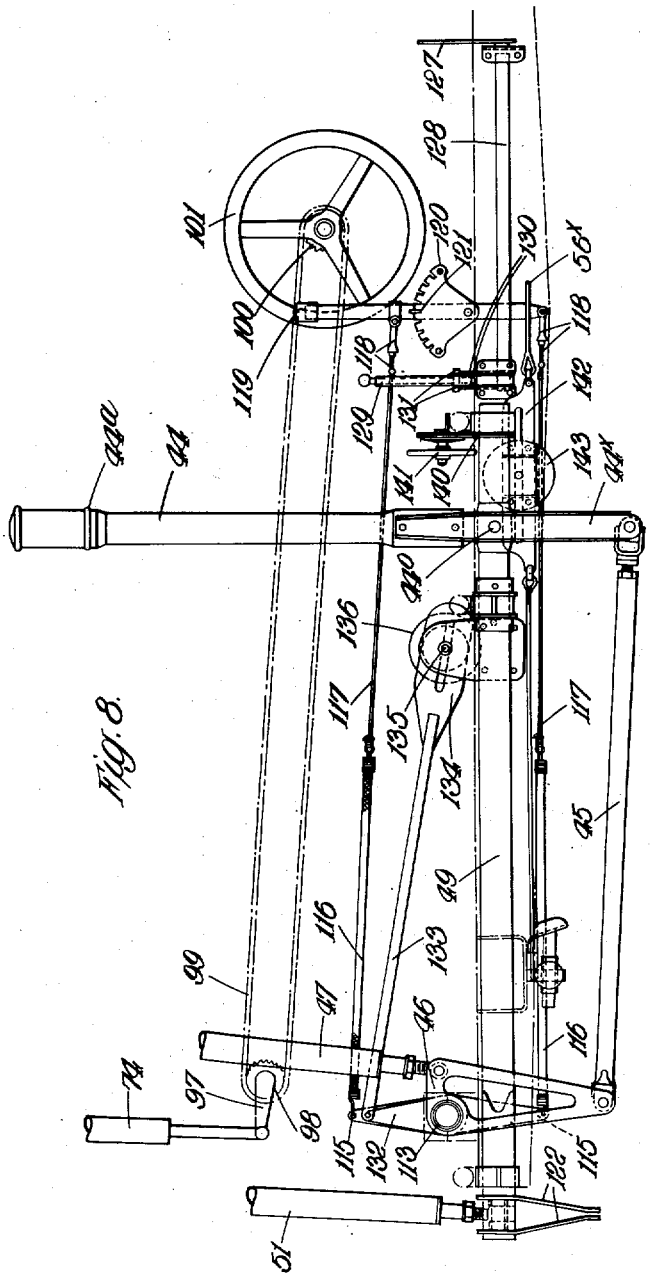

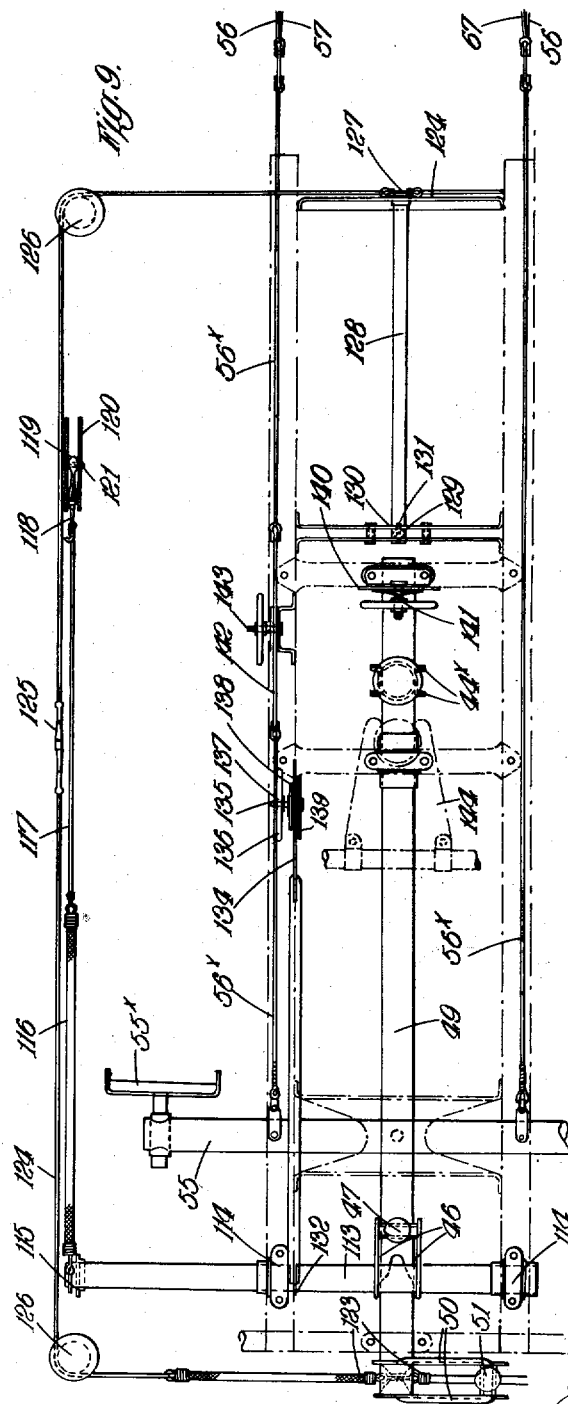

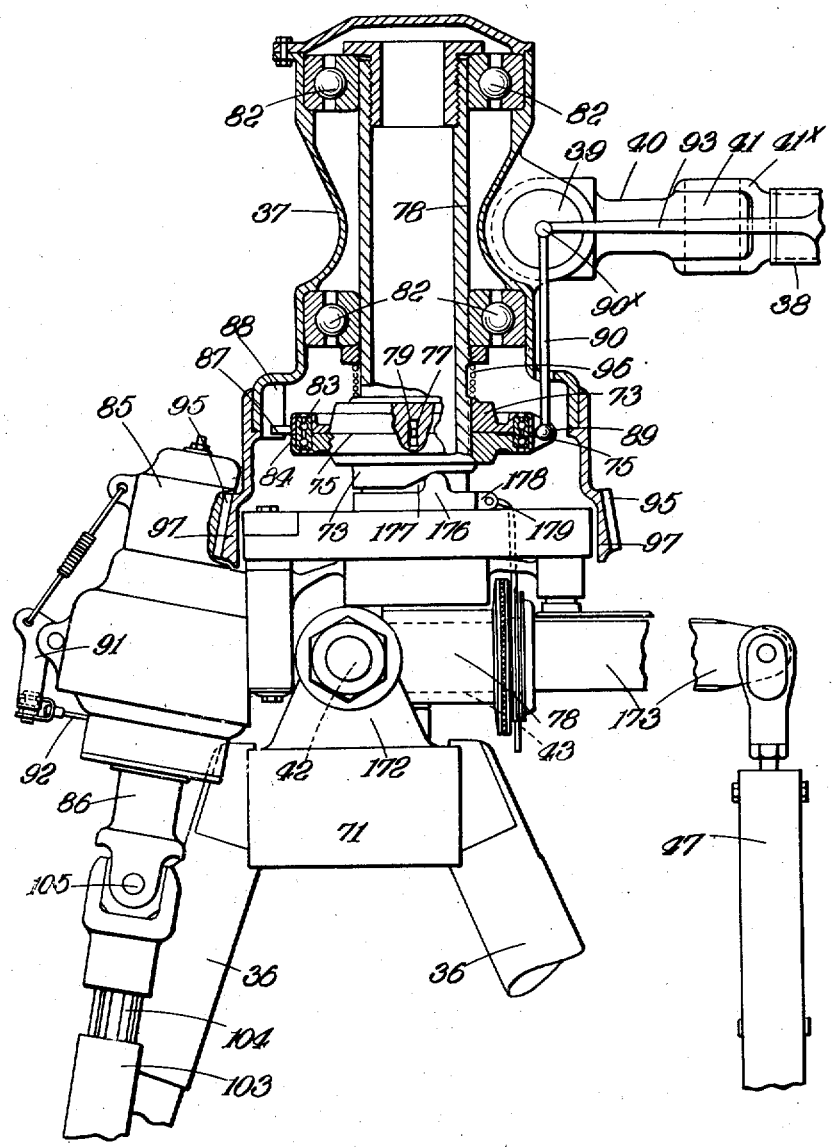

Patented July 31, 1945

2,380,582

UNITED STATES PATENT OFFICE 2,380,582

AIRCRAFT HAVING ROTATIVE WINGS

Juan de la Cierva, Madrid, Spain, assignor, by mesne assignments, to Autogiro Company of America, a corporation of Delaware Application November 16, 1933, Serial No. 698,372
In Great Britain November 26, 1932

25 Claims. (Cl. 244—18)

The present invention relates to aircraft whose principal means of support in flight consists of a sustaining rotor, i. e. a system of rotary wings or blades adapted to turn about a substantially vertical axis or axes.

The invention is applicable to aircraft in which the rotor is wholly power driven (helicopters) or to aircraft sustaining rotors of the type which are essentially autorotative, i. e. wind driven, though they may be adapted for intermittent or/and partial power drive for starting purposes or/and for assisting their autorotation in flight.

An aircraft sustaining rotor of the type referred to consists in general of a central rotative member or hub to which are secured the blades, which may be two or more in number, and the present invention refers to such rotors as have their blades flexibly or pivotally secured to the hub so as to be capable of entirely or substantially free "flapping" movements in planes containing the rotative axis of the hub or moderately inclined thereto, either individually or in pairs of oppositely disposed blades. Rotors so constructed will hereinafter be referred to as "articulated" rotors.

The principal object of the present invention is to effect the control in flight of the attitude and motion of an aircraft having as its principal sustaining means an articulated rotor of the kind described by operating on the elements of the rotor itself so as to modify its action.

In the arrangement to which this invention refers the controlling operation is performed on the blades of the rotor by varying their geometrical pitch angles.

By operating on the rotor in this manner an advantage is derived in that the control does not involve changing the orientation of the rotational axis of the rotor hub relatively to the aircraft, an advantage which is clearly of especial value in cases when a power drive either continuous, intermittent or occasional is applied to the rotor hub.

More particularly a periodic change of geometrical pitch angle is imparted to the rotor blades, either individually or in oppositely disposed pairs, in synchronism with the rotational period thereof, control being effected by varying the amplitude and the azimuth of such periodic pitch changes as hereinafter set forth.

The control operation on the pitch angles of the rotor blades may be effected by means of one or more pilot's control members of any convenient type, such as a lever or levers or a hand wheel or the like.

According to the present invention an aircraft having an articulated sustaining rotor of the kind referred to together with means for imparting to the rotor blades a periodic change of geometrical pitch angle and a pilot's control operating on said pitch changing means is characterised in that the connections of the pilot's control with the pitch changing means are so arranged that a control movement in at least one azimuth brings about a variation of the amplitude of periodic blade pitch angle change in a different azimuth, more particularly in an azimuth substantially perpendicular to that of the control movement, the phase of increased blade pitch being in advance of, i. e., in the quadrant of rotation next beyond that in which the control displacement occurs, with reference to the direction of rotation of the rotor.

Preferably a control displacement in the longitudinal azimuth of the aircraft effects a variation of amplitude of periodic blade pitch angle change in the transverse azimuth of the craft and a control displacement in the transverse azimuth effects a variation of amplitude of periodic blade pitch angle change in the longitudinal azimuth.

In further explanation of the foregoing statement reference may be had to Fig. 1 of the drawings which shows in diagrammatic form the relation between the changes of blade pitch angle and the control movement. The plane of the diagram is perpendicular to the rotor axis, i. e. substantially horizontal when the aircraft is in a normal flying attitude. The origin O coincides with the rotor axis and the axes XOX', YOY' are respectively fore and aft and transverse of the aircraft, the positive direction of X being directed forward. The direction of rotation of the rotor is shown by an arrow.

The pilot's controls governing the orientation of the aircraft in the longitudinal and lateral vertical planes are connected to a suitable mechanism for controlling the pitch angles of the rotor blades. When the pilot's controls are in the neutral position the pitch angle of all the rotor blades remains constant throughout their revolution through all azimuths. If now the longitudinal control is operated, the displacement of the control member being represented by the vector Ox, the pitch controlling mechanism is actuated to impart to all the rotor blades a periodic change of pitch angle such that the pitch of any blade attains a maximum value when the blade is at the azimuth OY' and a minimum value at azimuth OY the amplitude of this periodic change being represented by the vector Oy'. Similarly a displacement of the lateral control represented by Oy will produce a periodic change of blade pitch angle having maximum and minimum values in the azimuths OX and OX' respectively, the amplitude being represented by Ox'. It will be seen that the pitch amplitude vectors Oy', Ox' are advanced by 90° with respect to the direction of rotation from the control vectors Ox, Oy respectively associated therewith.

The resultant of the two displacements of the control, just described, is represented by the vector OC. If a universally jointed control column governing both longitudinal and lateral orientation of the aircraft is employed, the vector OC represents the actual displacement of the head of the control column, whereas if separate control members are employed the vector OC represents the vectorial sum of the independent control displacements.

The result of superposing the two periodic changes of blade pitch angle is a periodic change of pitch having its maximum at the azimuth OP and its amplitude represented by the length of vector OP.

It will be seen that in Fig. 1 the azimuths OC, OP are not exactly perpendicular but they lie within adjacent quadrants of the circle of rotation; the reason for this divergence from a true 90° relationship being in this instance that the selected gear ratios for longitudinal and lateral control are unequal, that is the ratio between longitudinal control displacement and the amplitude of associated lateral periodic pitch change is not the same as the ratio between lateral control displacement and associated longitudinal pitch amplitude. If however the scale of the vector representing one of the control displacements is adjusted to correct for difference of gear ratio as shown by Oy, the resultant control vector OC' will be perpendicular to the pitch vector OP, when using the particular type of hinged-blade rotor shown in the present case.

By employing this method the action of the pilot's controls on the aircraft conforms with what is generally termed "instinctive" control.

This result depends on the action of the rotor articulations in permitting the blades to flap, the effect being that the periodic change of blade pitch causes the virtual plane of rotation of the blades, as substantially defined by the path of the tips of the blades, to tilt in a vertical plane perpendicular to that containing the maximum and minimum pitch phases and in the direction corresponding to the control displacement.

Stating the operation in another way, control of the attitude of the craft with respect to a horizontal plane is effected in accordance with this invention by causing the blades to assume an increased geometrical pitch angle as they pass through the azimuth located generally 90° in advance (with respect to the direction of rotation of the rotor) of the azimuth in which it is desired to tilt the machine downwardly. At the same time, the blades are caused to assume a decreased pitch angle as they pass through the azimuth diametrically opposite the azimuth of increased pitch. This change of pitch, resulting in a shift of the direction of aerodynamic reaction upon the individual blade, causes the blades, by virtue of their freedom to swing on their flapping pivots, to move to a new path (or general plane) of rotation which is inclined in the direction of desired tilt of the machine; and the resultant shift of the rotor lift line sets up a couple in the desired direction about the center of gravity of the craft and thus produces the desired movement of the body.

The method of control according to the present invention is thus substantially equivalent in its action to the method of control by tilting the rotative axis of the rotor hub as described for example in my copending application No. 645,985 corresponding to British Patent 393,976; and it confers the same advantages as the latter method, i. e. that employing the tilting of the rotor axis, in that the power of the controls is independent of the forward speed of flight, as it depends only on the weight of the machine.

The method of the present invention also offers certain advantages over the method employing bodily tilting of the rotor axis by enabling equally powerful control forces to be obtained with proportionately smaller expenditure of effort on the part of the pilot.

It may be noted that when the control displacement is nil, i. e. the longitudinal and lateral controls are in neutral position, the amplitude of the periodic change of blade pitch angle is zero and the rotor will then operate as an articulated rotor without pitch varying means.

The hereinbefore described method of control by varying a periodic change of blade pitch angle may be combined with the use of means for varying the mean value of the geometrical blade pitch angle, i. e. by controllably altering the pitch angles of all the blades together.

Alternatively, means for varying the mean pitch angle of the blades may be combined with the method of control by bodily tilting the rotational axis of the rotor; certain embodiments thereof being shown in the present case and certain others in my copending application No. 738,-349 filed August 3, 1934 and corresponding to my British Patent No. 420,322. In the case of aircraft employing autorotative rotors important advantages are obtainable by the use of means for simultaneously varying the pitch angles of the rotor blades; for example:

(a) By decreasing the pitch angle of the blades to zero the power required for imparting an initial rotation to the rotor before taking flight can be considerably reduced.

(b) By considerably increasing the pitch angle of the blades just before landing the energy stored in the rotor can usefully be employed for checking the speed of descent and cushioning the landing.

(c) By decreasing the blade pitch angle to zero or even a negative value immediately after landing the lift of the rotor can be instantly destroyed and all danger of the aircraft being blown over in a strong wind easily obviated.

(d) Small variations of the mean blade pitch angle in flight may be utilised to improve the aerodynamic efficiency of the rotor, to keep its rate of rotation constant over the whole speed range or to adjust the rate of rotation to suit particular circumstances.

Generally an autorotative rotor with fixed pitch increases its rate of rotation as the forward speed increases; by increasing the blade pitch angle at the upper end of the forward-speed range the rate of rotation may be kept substantially constant and the aerodynamic efficiency improved.

The control of the simultaneous variation of the mean blade pitch angles may be carried out independently of the ordinary aircraft controls operating on the periodic changes of blade pitch angle or on the rotor tilting means. Preferably however the control of the simultaneous mean pitch variations may be carried out in conjunction with the normal aircraft controls in such a manner that the value of the mean blade pitch angle automatically depends on the position of the pilot's longitudinal control member.

In order to obtain the advantages enumerated in sub-paragraphs (a) to (d) above, the relation between the longitudinal control position and the mean pitch angle of the rotor blades is preferably of a special kind an example of which is shown graphically in Fig. 1a of the accompanying drawings in which the ordinates measured along the axis OD designate displacements of the longitudinal control measured from the furthest possible forward position while the abscissae measured along the axis O$\alpha$ represent the mean pitch angle of the rotor blades measured from "no lift." The curve OF gives the relation between the control displacement and the mean pitch angle. With the control member fully forward (point O on the curve) the mean pitch angle $\alpha$ is zero or negative; in Fig. 1a it is shown as zero. This corresponds with the position for starting the rotor before flight, taxiing and for destroying the lift after landing. A slight backward movement of the control (ordinate $D_1$) brings the blade pitch angle $\alpha$ to a moderately large value corresponding with flight at the maximum forward speed. Further backward movement of the control gradually decreases the pitch angle corresponding to the requirements throughout the normal speed range comprised between ordinates $D_1$ $D_2$, while the last part of the backward movement of the control to ordinate $D_3$ which represents the maximum backward control displacement increases the blade pitch angle very rapidly to a value generally larger than the previous maximum for utilising the kinetic energy of the rotor in landing.

If desired the rotor may be mounted in such a manner that its axis member (and with it the whole rotor) is bodily displaceable with respect to the aircraft, such bodily displacement being independently controlled, as shown for example in Figure 17 of my aforementioned copending application 645,985.

By bodily displacing the rotor axis longitudinally of the aircraft the attitude of the body of the aircraft to the flight wind may be controlled in the longitudinal vertical plane independently of the speed of the aircraft and of the longitudinal position of the centre of gravity, so that the pilot will always be able to trim the aircraft to fly at the best attitude to the flight wind at any speed, in spite of alterations in the position of the centre of gravity.

In order to suppress vibration and make the controls of the rotor-blade pitch-varying means smooth in operation damping devices may be incorporated.

The control members for operating the rotor-blade pitch-variation or/and the displacement of the rotor axis member may comprise a control lever of the normal aeroplane type, with or without a wheel for lateral control, movable in the normal manner for controlling the longitudinal and transverse attitudes of the aircraft.

Alternatively, separate control members may be employed for longitudinal and lateral control respectively. In this case the longitudinal control member may be provided with means normally holding the control in any desired position and, if desired, quick release means for the holding means may be embodied. In addition a separate control member, preferably a pedal, may be provided, which on being firmly pressed operates on the rotor-blade pitch-variation means to increase the angle of incidence of the rotor as a whole, such pedal being in some respects analogous to the brake pedal of a motor car. The said pedal or the like may conveniently be provided with powerful spring return means.

In an aircraft of the type referred to having lateral (transverse) control means according to this invention, a controllable rudder for directional steering may be dispensed with if desired, since the tilting of the virtual plane of rotation of the rotor blades sideways for lateral control introduces no appreciable yawing moments on the aircraft and hence, if the body of the aircraft possesses a reasonable degree of weathercock stability, the aircraft will automatically turn when a bank is initiated and held on by means of the lateral control.

Further in an aircraft constructed and operating according to this invention some or all of the usual fixed and adjustable stationary surfaces for longitudinal and transverse stability and control may be dispensed with.

Alternatively the control means of the present invention may be employed in conjunction with stabilising and control surfaces of the ordinary type, such surfaces together with rotor-blade pitch-variation means being, if desired, actuated by a common control member or members, such as a control lever of the ordinary type.

In order more particularly to prevent the pilot from diving the aircraft at a dangerous speed stop means may be embodied to limit the amplitude of rotor-blade pitch-variations imposable by the controls.

The aircraft is preferably so constructed that with the rotor removed, the stability of the remainder of the aircraft, i. e. body, undercarriage, etc. both with and without the airscrew running, is positive or at least neutral in pitch and roll and positive in yaw.

To achieve stability in pitch a small fixed horizontal tail may conveniently be employed, the tail volume being about two-thirds of that required by an equivalent fixed wing aeroplane, the elevators being included in computing the tail volume of a normal aeroplane. Stability in roll may be obtained by means of adequate keel-surface above the centre of gravity to provide a righting moment in a side slip; while stability in yaw may be provided for by the usual vertical fin or fins.

Although in aircraft of the type described it is not proposed to employ regular elevators it may be advantageous to provide means of trimming the fixed horizontal tail plane in flight through a short angular range, so as to counteract longitudinal displacements of the aircraft's centre of gravity, such displacements being caused by variations in the weight and stowage of the disposable load, i. e. passengers, cargo, etc., more especially in aircraft of large size and capacity.

The present invention comprises all of the novel features herein described, or either severally, and all disclosed combinations novel over the art and as defined in the appended claims, and is not considered as restricted to what is herein shown and described but includes all modifications that will occur to those skilled in the art within the ambit of said claims.

The following description of an embodiment of the invention with a modification thereof has reference to Figs. 2 to 12 of the accompanying drawings, the showing of Figs. 1 and 1a having been described above.

In the drawings:

Figs. 2, 3 and 4 show the general arrangement of an aircraft embodying the invention, in front elevation, plan and side elevation respectively.

Fig. 5 shows the rotor axis structure and control parts associated therewith in side elevation, partly in section.

Figs. 6 and 7 show in plan section and rear elevation respectively certain parts of the showing of Fig. 5.

Figs. 8 and 9 show the control arrangements in the pilot's cockpit in side elevation and plan respectively.

Fig. 10 shows in side elevation a modification of certain details of the showing of Fig. 8.

Figures 10a and 10b illustrate, in a manner similar to the showing of Figure 10, two additional modifications of the showing of Figure 8.

Figs. 11 and 12 show a modification of the arrangement of rotor axis structure in side and rear elevation respectively.

Figure 4:
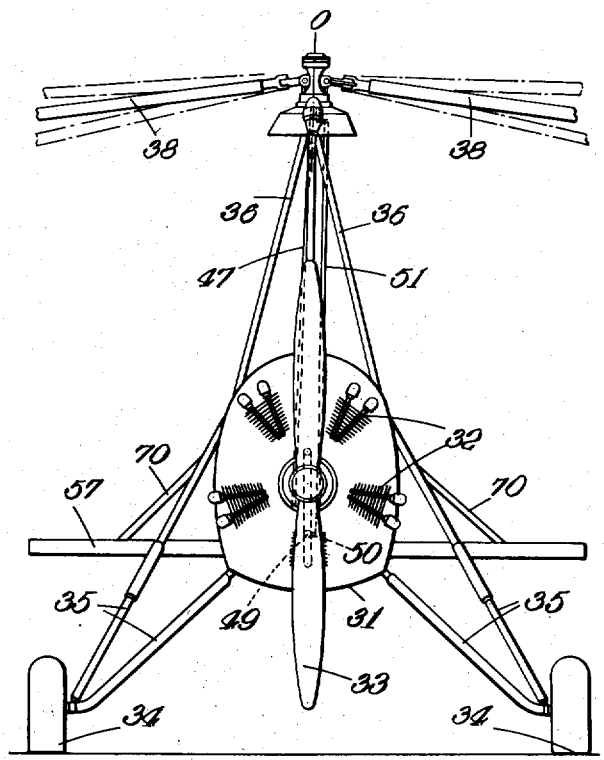

Referring to Figs. 2, 3 and 4, the aircraft includes a body 31, engine 32, driving a propulsive airscrew 33, main supporting wheels 34 mounted on undercarriage struts 35 and a pyramidal supporting structure composed of struts 36 at the apex of which is mounted the rotor. This latter comprises blades 38 secured to a hub member 37 by horizontal pivots 39, links 40 and vertical pivots 41. The hub 37 is mounted on an axis structure illustrated in Figs. 5, 6 and 7.

The centre of gravity of the aircraft is indicated at $g$, and the line joining the point $g$ to the rotor centre makes an angle of approximately six degrees with a plane normal to the longitudinal body axis of the aircraft.

The rotor centre is defined as the point in which the rotor axis, indicated at $o$—$o$, cuts the plane of the pivots 39.

The flying controls of the aircraft comprise a control column 44 of the usual type, arranged in a pilot's cockpit 69, the longitudinal control being effected by longitudinally rocking the control column and the movement of the latter being transmitted by means of a rod 45 and bell crank 46 to rod 47, while transverse rocking of the column 44 is transmitted by means of a rocking shaft 49 and crank 50 to rod 51 to effect lateral control.

On the rear end of the aircraft body 31 is mounted a fixed vertical fin 53 and a rudder 54 on which is mounted a double-ended lever 54$^x$ connected by means of cables 56 with a rudder bar 55 having pedals 55$^x$.

On the rear end of the body are also mounted small horizontal stabilisers 57 having sufficient area to endow the body (together with its various fixed appendages, such as the undercarriage and rotor mounting pyramid) with a positive degree of stability in pitch. The stabilisers 57 are braced to the body by struts 70 and pivotally mounted to rock about an axis 58, their incidence being adjustable through a small angle by means of a rod 59, bell crank 60, cables 61 and a hand lever 62 which can be secured in any desired position by means of a ratchet quadrant 63.

The rear end of the craft is supported on the ground by a steerable tail-wheel 64 carried in a fork 65 which is pivotally mounted in the body at 66. Steering of the tail-wheel is effected by means of cables 67 which incorporate springs 68 and are attached to the rudder controlling cables 56.

It will be noted that the main wheels 34 are situated markedly forward of the centre of gravity $g$ the line joining the wheel centre to the point $g$ being inclined backwardly to the ground line $e$—$e$ (when the aircraft is resting on all three wheels) at a much more acute angle than is usual in the case of ordinary aeroplanes. This angle is so chosen that the aircraft will not nose over on the ground, with the wheels braked or chocked and the airscrew developing its maximum thrust or/and the rotor developing the maximum lift of which it is capable under the influence of the power drive for starting the rotor as hereinafter described, even on a small forward slope, in spite of the fact that there are no elevators whereby a large down load may be applied at the tail through the action of the slipstream.

Referring to Figs. 5 to 7 the rotor axis structure comprises an apex member 71 secured by bolts (not shown) to the upper ends of the pyramid struts 36 shown in Figs. 2 to 4.

In the apex member 71 is secured an axis member 78 on which is mounted by means of combined thrust and radial bearings 82 the rotor hub 37. On the axis member 78 is slidably mounted by means of splines 72a a collar 73 which can be raised and lowered by means of an actuating rod 74. The collar 73 carries a ring member 75, which is enabled to move universally on collar 73, as by means of spherically shaped joint faces 76, but is prevented from turning about the axis of collar 73 by pins 77 on collar 73 engaging diametrically opposed slots 79 in ring 75. The latter carries extension arms 80, 80$^x$ connected respectively through pin and slot joints 81, 81$^x$ with bell cranks 52, 48 which are pivoted on the apex member 71 and are respectively actuated by the rods 51, 47.

On the ring 75 is mounted by means of a bearing 83 an outer ring 84 which is compelled to rotate with the hub member 37 by the engagement of pins 87 on ring 84 with diametrically opposed pairs of guides 88 arranged on the inner face of hub member 37 parallel with its axis.

The ring 84 is provided with lugs 89 to which are universally jointed rods 90 whose upper ends are universally jointed at 90$^x$ to levers 93 secured to the rotor blades 38 which are rotatable about their longitudinal axes on forked root members 41$^x$ carried on the vertical pivots 41. When the rotor blades 38 are in their mean position both as regards pitch angle and horizontal movement about pivots 41 the joints 90$^x$ are in alignment with the pivots 39; this ensures that the pitch angles of the blades are not disturbed by vertical swinging of the blades on pivots 39.

As regards the operation of the controls it will be seen by reference to Fig. 2 that a forward rocking of the control column 44 results in an upward movement of rod 47 and thereby causes through the action of bell crank 48 and extension arm 80$^x$ a lateral inclination of members 75 and 84 downward to the left. The lateral inclination of the rotative member 84 gives rise to a reciprocating movement of rods 90 transmitted by levers 93 to the rotor blades 38 as a periodic rocking movement about their longitudinal axes, i. e. a periodic change of geometrical pitch angle. The rods 90 being raised to the right and lowered to the left and the levers 93 being arranged with reference to the direction of rotation, as shown by the arrow in Fig. 6, forwardly of the axes of the members 41$^x$ about which the blades 38 rock, it follows that the pitch angle is decreased to the left and increased to the right as is required for accordance with the invention; the direction of rotation being clockwise viewed from above, so that the azimuth of increased pitch (right) is in advance of the azimuth of control movement (forward) by 90°.

Similarly a rocking of the control column 44 to the right raises the rod 51 and rocks the ring member 84 forwardly, i. e. downwardly in front, and this brings about a periodic pitch angle change of the rotor blades with maximum and minimum respectively in the rearward and forward azimuth. This also agrees with the requirements of the invention since the rearward azimuth is in advance of the control azimuth (to the right) with respect to the direction of rotation of the rotor.

Figure 1:
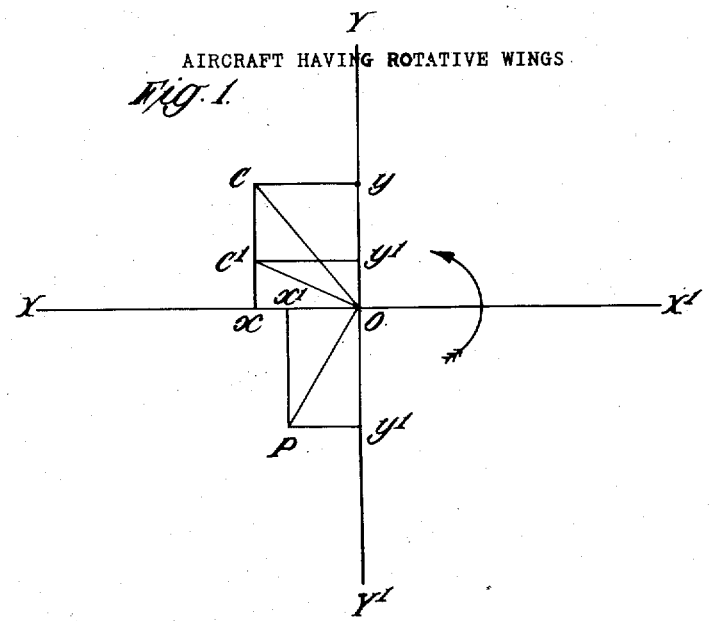
Fig. 1 represents diagrammatically the function of the periodic rotor blade pitch control.

It should be noted that the above description of construction and operation of the periodic (cyclic) control of blade pitch (with particular reference to the mechanism illustrated in Figures 2 to 9) applies to a machine whose rotor turns in a clockwise direction, as viewed in top plan (see Figure 3). This is opposite to the direction of rotation shown in the diagram of Figure 1, but it will be understood that the principles discussed in the first part of this specification, with reference to Figure 1, are equally applicable, regardless of the sense of rotation of the rotor. In either case, the chief principle to be observed is that the control connections from the stick to the rotor blades in an articulated rotor must be so coupled up that when the stick is moved forwardly (for example) the maximum blade pitch increase will occur at the retreating side of the rotor and the maximum pitch decrease at the advancing side (with a similar phase relationship for other stick movements).

The control rod 74 by raising and lowering bodily the members 73, 75, 84, 90 and 93 effects a variation of mean pitch angle of the rotor blades; the pin and slot joints 81, 81$^x$ permitting the member 75 to be raised and lowered without disturbing the engagement of extension 80, 80$^x$ with the bell cranks 52, 48.

Referring again to Figs. 5 to 7 the hub member 37 has bolted thereto a crown wheel 95 forming the final drive member of the rotor starting mechanism which includes a pinion 94 meshed with the crown wheel 95 and enclosed in a gear-housing 85 which carries the bearings for a driving shaft 86 which drives the pinion 94 through a clutch device (not shown) which is engageable and disengageable by means of a lever 91 and cable 92 and usual release spring 19a.

The shaft 86 receives its drive from an upwardly extending shaft 103 through a telescopic joint 104 and a universal joint 105. The shaft 103 is driven by the engine 32 through drive elements generally indicated in Fig. 2 at 103$^x$.

The rods 47, 51 are of tubular construction and are resiliently connected with the bell cranks 48, 52, respectively. A description of the construction for rod 51 will suffice, as the rod 47 is similar. The resilient connection to the bell crank 52 is by means of columns of rubber rings 106 in compression, which bear against abutments 107 secured to the tubular member 51 and against a collar 108 formed on a rod 109 which is slidable longitudinally of the tubular member 51, being guided in the abutments 107 and connected to the bell crank 52 by means of a forked shackle 110.

A similar rod 109 similarly mounted in the tubular rod 47 is connected with the bell crank 48 by means of fork 111.

Referring to Figs. 8 and 9; the flying controls include in addition to those parts already described, a transverse rocking shaft 113 on which the bell crank 46 is mounted. This rocking shaft carries at one end a double lever 115 to the ends of which are shackled elastic cords 116 which are connected by cables 117 and adjustable tensioning devices 118 with a hand lever 119, having a spring-catch 121 engaging a notched quadrant 120. By this means an elastic bias may be applied to the longitudinal control of the aircraft, the control position corresponding to zero bias, i. e. equal tension of the two cords 116, being determined by the position of the hand lever 119 and the force exerted by the bias being adjustable by means of the devices 118.

A similar elastic bias arrangement for the lateral control comprises a vertical lever 122 mounted on the forward end of the rocking shaft 49 and elastic cords 123 shackled to cables 124 incorporating tensioning devices 125 and led over pulleys 126 for attachment to a vertical lever 127 mounted on a longitudinal rocking shaft 128, carrying at its forward end a hand lever 129 having a spring catch 131 for engagement with a notched quadrant 130.

As shown in Fig. 9, the rudder cables 56 and tail wheel cables 57 are together shackled to cables 56$^x$ whose forward ends are shackled to the rudder bar 55.

All the controls may be completely or partially locked by means of frictional devices; that for the longitudinal controls consisting of a rod 133 pinned at one end to a lever 132 mounted on the cross shaft 113 and fixed at its other end to a slotted plate 134 embracing a threaded pin 135 carrying a clamping washer 138, cushioning spring 137 and adjustable nut in the form of a hand wheel 136, whereby the plate 134 may be gripped against an abutment plate 139.

A similar friction locking device for the lateral control, generally indicated at 141, serves to clamp a slotted quadrant 140 mounted on the rocking shaft 49. For the rudder control a friction device 143, similar to those for the rotor controls, serves to clamp a slotted plate 142 incorporated in one of the cables 56$^x$.

The control column 44 is of tubular form and is extended by means of a pair of plates 44$^x$ secured to its lower end, which plates are pivoted at 44° for longitudinal rocking on the rocking shaft 49.

For controlling the mean value of the rotor blade pitch angles the rod 74 may be connected, as shown in Fig. 8, to a lever 97 mounted on the shaft of a sprocket 98 which is coupled by means of a chain 99 to a second sprocket 100 which is rotatable by means of a hand wheel 101.

In a modified construction the control of the mean blade pitch angle is coupled with the longitudinal control of the aircraft as shown in Fig. 10, which shows a toothed sector 160 mounted on the transverse rocking shaft 113 and meshing with a pinion 161 which carries a cam 162 engaging the lower end of the rod 74, the latter being suitably guided by any convenient guide means (not illustrated) and compelled to follow the cam 162 by a spring loading device such as the spring 96 shown as bearing on the top of collar 73 in Fig. 5.

Figure 1A:
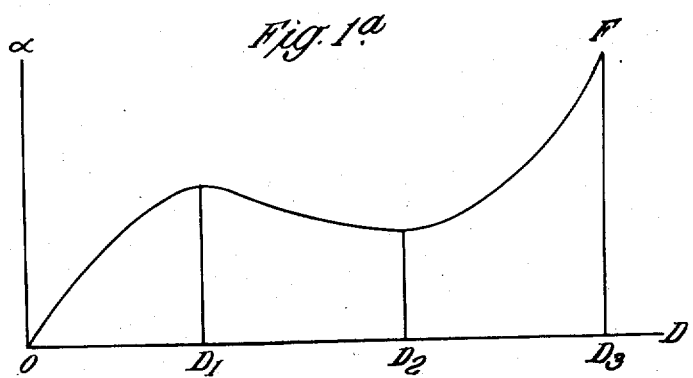
Fig. 1a represents diagrammatically a preferred functioning of the combined longitudinal aircraft control and mean rotor blade pitch control.

The profile of the cam 162 is laid out so as to produce the required relation between the longitudinal control displacement and the mean pitch angle of the rotor blades, for example, as hereinbefore described with reference to Fig. 1a of the drawings.

Figure 10a illustrates the same arrangement as in Figure 10, except for the additional showing of the clutch control cable 92 connected with the member 46. This arrangement provides for engagement of the rotor driving clutch (described above in connection with Figure 5) when the control column 44 (see Figure 8) is moved forwardly beyond the normal flying range, and for automatic disengagement of the clutch except when the control column is moved forwardly beyond the normal flying range.

In the modification of Figure 10b, a similar connection of the clutch control cable 92 is made to the member 46. In this form, however, as in Figure 8, a separate control is employed (see handwheel 101 in Figure 8) for increasing and decreasing the mean pitch of all of the blades, instead of the gear segment, pinion and cam (160, 161 and 162) of Figures 10 and 10a.

Figs. 11 and 12 illustrate a modification in which the longitudinal and lateral control is carried out by bodily tilting the rotor axis member, while the mean blade pitch angle is variably controllable at will throughout a predetermined pitch range.

In this construction the apex member 71 incorporates a fork 172 carrying a transverse pivot pin 42 on which is pivoted an intermediate member 174, of which a backward projection forms a longitudinal pivot 43 on which is pivoted the axis member 78, the projection also serving as a mounting for an arm 173 which is connected to the rod 47 for longitudinal control, while the rod 51 for lateral control is connected to an arm 175 fixed to the axis member 78. Longitudinal control is effected by tilting the rotor axis member about the pivot 42 by means of the train of members 173, 47, 46, 45 and 44, and lateral control by tilting the rotor axis member laterally by means of the train of members 175, 51, 50, 49 and 44 (see also Figs. 2 to 4).

The control of the mean pitch angles of the rotor blades is carried out as before by raising and lowering the collar 73, but in this case, since no periodic change of blade pitch angle is required, the bearing ring 75 is made unitary with the collar 73 and is not tiltable with respect to the axis member 78.

The raising and lowering of the collar 73, 75 is effected by means of a cam ring 176 rotatable on the axis member 78 and engaging a cam face 177 on the underside of collar 73 which is held down on to the cam ring by spring 96.

The cam ring 176 carries an actuating arm 178 which is controllable from the pilot's cockpit through a flexible transmission device such, for instance, as a "Bowden" control shown at 179. This flexible transmission allows the control of the mean blade pitch angle to function without disturbance by the tilting of the rotor axis.

The connections of the flexible control means 179 to the controls in the pilot's cockpit are not illustrated, as their details may be of any suitable type, and the pilot's controls for governing the mean blade pitch angle may include either a separate control, for instance as illustrated in Fig. 8, or a coupling with the longitudinal control for rotor tilting, including a specially shaped cam transmission, as already described with reference to Fig. 10.

Features disclosed but not claimed herein are claimed in various copending applications including application 645,985 filed Dec. 6, 1932, application 738,349 filed Aug. 3, 1934, application 59,292 filed Jan. 15, 1936, and related applications.

What I claim is:

1. In an aircraft, a sustaining rotor comprising a plurality of sustaining blades adapted to rotate about an approximately upright axis and further comprising a hub structure and means providing for swinging movements of the blades generally transversely of their rotative path of travel to accommodate differential flight forces, means mounting the blades on the hub structure providing for bodily shift of each blade as an entirety with respect to the hub for periodic variation of the geometrical pitch settings of the blades on the hub, a pilot's control member movable with respect to the aircraft in at least one azimuth, connections between said member and the rotor adapted to controllably shift the blades on their pitch-varying mountings, said connections being so coupled that the maximum pitch variation of the blades occurs when their longitudinal axes are passing through those quadrants of the rotative path which are at right angles to the azimuth of movement of the control member and that the maximum increase of pitch is effected in the quadrant which, with relation to the direction of rotation of the rotor, is next beyond the azimuth of control member movement, and that the maximum decrease of pitch is effected at a point approximately diametrically opposite the maximum increase of pitch, whereby the blade pitch variation and blade swinging cooperate in altering the path of blade rotation for control of the craft.

2. In an aircraft, a sustaining rotor comprising a plurality of sustaining blades adapted to rotate about an approximately upright axis and further comprising a hub structure and means providing for swinging movements of the blades generally transversely of their rotative path of travel to accommodate differential flight forces, means mounting the blades on the hub structure providing for bodily shift of each blade as an entirety with respect to the hub for periodic variation of the geometrical pitch settings of the blades on the hub, a pilot's control member movable with respect to the aircraft in a fore and aft direction, connections between said member and the rotor adapted to controllably shift the blades on their pitch-varying mountings, said connections being so coupled that, upon a forward movement of the control member, the maximum increase of pitch is effected in the quadrant of the circle of rotation which is centered on that side of the rotor at which the blades retreat with respect to forward translational movement of the craft, and that the maximum decrease of pitch is effected in the quadrant of the circle of rotation which is centered on that side of the rotor at which the blades advance with respect to forward translational movement of the craft, whereby the blade pitch variation and blade swinging cooperate in altering the path of blade rotation for control of the craft.

3. In an aircraft, a sustaining rotor comprising a plurality of sustaining blades adapted to rotate about an approximately upright axis and further comprising a hub structure and means providing for swinging movements of the blades generally transversely of their rotative path of travel to accommodate differential flight forces, means mounting the blades on the hub structure providing for bodily shift of each blade as an entirety with respect to the hub for periodic variation of the geometrical pitch settings of the blades on the hub, a pilot's control member movable with respect to the aircraft transversely thereof, connections between said member and the rotor adapted to controllably shift the blades on their pitch-varying mountings, said connections being so coupled that the maximum pitch variation of the blades occurs when their longitudinal axes are passing through the quadrants of the rotative path which are centered on the longitudinal axis of the craft and that, upon a given control member movement, the maximum increase of pitch is effected in the longitudinal quadrant which, with relation to the direction of rotation of the rotor, is next beyond the transverse position to which the control member has been moved, and that the maximum decrease of pitch is effected at a point approximately diametrically opposite the maximum increase of pitch, whereby the blade pitch variation and blade swinging cooperate in altering the path of blade rotation for control of the craft.

4. A construction according to claim 1, with mechanism for regulating the mean blade pitch independently of operation of the periodic pitch control referred to in claim 1.

5. A construction according to claim 1, with mechanism for adjusting the mean blade pitch through a range including an autorotational pitch.

6. In an aircraft, a multi-bladed sustaining rotor adapted to accommodate differential flight forces, including a tiltably mounted axis structure, control means operative on said axis structure to tilt the same generally longitudinally of the craft and a connection with said control means for varying the mean geometrical pitch angles of the blades thereof, which connection is operative to vary the mean pitch angles upon movement of the control means in the same sense as that employed to effect longitudinal tilt.

7. In an aircraft, a multi-bladed sustaining rotor adapted to accommodate differential flight forces, longitudinal aircraft control means operative on the rotor for varying a periodic change of the geometrical pitch angles of the blades thereof and for simultaneously varying the mean geometrical pitch angle of said blades, and means positively predetermining the relationship of said two variations.

8. In an aircraft, a multi-bladed sustaining rotor adapted to accommodate differential flight forces, longitudinal aircraft control means operative on the rotor for varying the amplitude in a generally transverse azimuth of a periodic change of the geometrical pitch angles of the blades thereof, said periodic change being synchronous with the rotation period of the rotor, and for simultaneously varying the mean geometrical pitch angle of said blades, and means positively predetermining the relationship of said two variations.

9. In an aircraft, a multi-bladed sustaining rotor adapted to accommodate differential flight forces, longitudinal aircraft control means movable fore and aft of the craft and a connection with said control means operative on the rotor for varying the mean geometrical pitch angles of the blades thereof, including means providing a substantially smaller mean pitch angle when the control means is fully forward than when it is fully back.

10. In an aircraft, a multi-bladed sustaining rotor adapted to accommodate differential flight forces, longitudinal aircraft control means movable fore and aft of the craft and a connection with said control means operative on the rotor for varying the mean geometrical pitch angles of the blades thereof including means providing a substantially no lift setting when the control means is fully forward, substantially the maximum useful value when the control means is fully back and an intermediate value over the range of control means position corresponding to the normal flight range.

11. In an aircraft, a multi-bladed sustaining rotor adapted to accommodate differential flight forces, longitudinal aircraft control means movable fore and aft of the craft and a connection with said control means operative on the rotor for varying the mean geometrical pitch angles of the blades thereof including means providing a substantially no lift setting when the control means is fully forward, substantially the maximum useful value when the control means is fully back and an intermediate value over the range of control means position corresponding to the normal flight range, said intermediate value decreasing slightly as the control means is moved from the position for maximum speed in horizontal flight to that for minimum speed in horizontal flight.

12. In an aircraft, a rotatable sustaining rotor adapted to accommodate differential flight forces and including sustaining wing means radially disposed about a common center, means operative on said rotor and controllable in flight to vary in at least one azimuth the inclination, with reference to the aircraft, of a plane substantially containing the path swept by the outer extremities of said wing means, means for varying the average value of the geometrical pitch angles of said wing means, and means positively predetermining the relationship of said two variations.

13. In an aircraft, a multi-bladed sustaining rotor adapted to accommodate differential flight forces, control means operative on the rotor for controlling the aircraft longitudinally, and a connection with said control means for varying the mean geometrical pitch angle of all the blades of the rotor, which connection is operative to vary the mean pitch angle upon movement of the control means in the same sense as that employed to effect longitudinal control of the craft.

14. In an aircraft, a multi-bladed sustaining rotor adapted to accommodate differential flight forces and including a tiltably mounted axis structure, control means operative on said axis structure to tilt the same generally longitudinally of the craft, and a connection with said control means for varying the mean geometrical pitch angle of all the blades of the rotor, which connection is operative to vary the mean pitch angle upon movement of the control means in the same sense as that employed to effect longitudinal tilt.

15. A rotative-winged aircraft having a fuselage and a single multi-bladed sustaining rotor adapted to be aerodynamically driven by relative air-flow and having its blades pivoted to compensate for inequalities of effective lift of the blades on opposite sides of the craft, means for tilting the rotor-hub axis longitudinally and transversely with respect to the fuselage, means for varying the pitch of the blades, and a manual control device common to said tilting means and said pitch varying means.

16. In an aircraft, a rotor comprising a hub member adapted to rotate about a generally upright axis and a radially extending blade having a root end mounting member, mechanism for pivotally interconnecting the hub and said mounting member to provide for pivotal movements of the blade as a whole with respect to the hub, said pivot mechanism including a flapping pivot providing freedom for upward and downward swinging movement of the blade during normal flight maneuvering, and the pivot mechanism further including a pitch change pivot operatively interposed between the flapping pivot and the blade mounting member whereby the pitch of the blade may be altered as a unit without shifting the position of the flapping pivot, and controllable means for cyclically varying the pitch angle of the blade in synchronism with rotation of the rotor including a pilot's control and connections coupled with the pilot's control and extended therefrom beyond the flapping pivot to the root end blade mounting member, said connections being flexibly-jointed adjacent the flapping pivot axis to accommodate the swinging movements of the blade on the flapping pivot without introducing extensive pitch change movements as a result of said blade swinging movements.

17. A construction according to the preceding claim, with control means adapted to alter the mean blade pitch, said control means and the controllable means for cyclically varying the pitch being independently operatable.

18. A construction according to claim 16, with control means coupled to move the blade on the same pitch change pivot to adjust the mean blade pitch and being operative independently of the cyclic pitch variation.

19. In an aircraft, an autorotatable sustaining rotor comprising a generally upright hub structure and a plurality of sustaining blades positioned to rotate about the axis of the hub, mechanism for mounting the blades on the hub structure including means providing for swinging movements of the blades generally transverse their rotative path of travel to accommodate differential flight forces and means providing for bodily shift of each blade as an entirety with respect to the hub for variation of the geometrical pitch settings of the blades on the hub, a pilot's control member movable with respect to the aircraft in at least one direction, and connections between said member and the rotor adapted to controllably shift the blades on their pitch-varying mountings, said connections being so coupled that the maximum pitch variation of the blades occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch.

20. In an aircraft, an autorotatable sustaining rotor comprising a generally upright hub structure and a plurality of sustaining blades positioned to rotate about the axis of the hub, mechanism for mounting the blades on the hub structure including means providing for swinging movements of the blades generally transverse their rotative path of travel to accommodate differential flight forces and means providing for bodily shift of each blade as an entirety with respect to the hub for variation of the geometrical pitch settings of the blades on the hub, a pilot's control member movable with respect to the aircraft in at least one direction, connections between said member and the rotor adapted to controllably shift the blades on their pitch-varying mountings, said connections being so coupled that the maximum pitch variation of the blades occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch, and means for varying the average geometrical pitch settings of the blades.

21. In an aircraft, an autorotatable sustaining rotor comprising a generally upright hub structure and a plurality of sustaining blades positioned to rotate about the axis of the hub, mechanism for mounting the blades on the hub structure including means providing for swinging movements of the blades generally transverse their rotative path of travel to accommodate differential flight forces and means providing for bodily shift of each blade as an entirety with respect to the hub for variation of the geometrical pitch settings of the blades on the hub, a pilot's control member movable with respect to the aircraft in at least one direction, and connections between said member and the rotor adapted to controllably shift the blades on their pitch-varying mountings, said connections being so coupled that the maximum pitch variation of the blades occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch, said connections between the rotor and the pilot's control member further providing for variation of the average geometrical pitch settings of the blades.

22. In an aircraft, an autorotatable sustaining rotor comprising a generally upright hub structure and a plurality of sustaining blades positioned to rotate about the axis of the hub, mechanism for mounting the blades on the hub structure including means providing for swinging movements of the blades generally transverse their rotative path of travel to accommodate differential flight forces and means providing for variation of the effective geometrical pitch angle of the blades throughout the length thereof, a pilot's control member movable with respect to the aircraft in at least one direction, and connections between said member and the rotor adapted to controllably vary the pitch angle of the blades, said connections being so coupled that the maximum pitch variation of the blades occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch.

23. In an aircraft, an autorotatable sustaining rotor comprising a generally upright hub structure and a plurality of sustaining blades positioned to rotate about the axis of the hub, mechanism for mounting the blades on the hub structure including means providing for swinging movements of the blades generally transverse their rotative path of travel to accommodate differential flight forces and means providing for variation of the effective geometrical pitch angle of the blades throughout the length thereof, a pilot's control member movable with respect to the aircraft in at least one direction, connections between said member and the rotor adapted to controllably vary the pitch angle of the blades, said connections being so coupled that the maximum pitch variation of the blades occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch, and means for simultaneously varying the effective geometrical pitch angle of all of the blades in the same sense.

24. In an aircraft, a sustaining rotor including a generally vertical axis structure and sustaining blades articulated to the axis structure for swinging movements relatively thereto in generally vertical planes, means for varying the amplitude in an azimuth generally transverse of the aircraft of a periodic change of geometrical pitch angle of the rotor blades, a pilot's hand control member operative on said means and a pilot's foot pedal also operative on said means, depression of the pedal causing the pitch angle of the advancing rotor blades to increase and of the retreating blades to decrease.

25. In an aircraft, a sustaining rotor including a hub member rotatable about a generally vertical axis and radially disposed sustaining wings, means articulating the wings to the hub member for swinging movements relatively thereto, means operative on said rotor and controllable in flight to vary in at least one azimuth the inclination with reference to the aircraft of a plane substantially containing the path swept by the outer extremities of the sustaining wings, means for varying the average geometrical pitch angle of the sustaining wings, the structure of said three means being such as to provide for free operation of each of such means without appreciably disturbing the functioning of the others, and the craft further including an engine for forward propulsion, and power transmission means connecting said engine with the rotor for rotor-starting purposes, said transmission means including a controllable coupling, and means interconnecting the controllable coupling and the control for varying the path swept by the extremities of the wings constructed and arranged so that the coupling is automatically disengaged except when the said control is displaced forwardly to a position beyond the normal flying range.

JUAN DE LA CIERVA.

CERTIFICATE OF CORRECTION.

Patent No. 2,380,582. July 31, 1945.

JUAN de la CIERVA.

It is hereby certified that error appears in the printed specification of the above numbered patent requiring correction as follows: Page 3, second column, line 67, for the words "described, or either" read --illustrated or described--; and page 5, first column, line 67, for "spring 19a" read --spring 91a--; and that the said Letters Patent should be read with this correction therein that the same may conform to the record of the case in the Patent Office.

Signed and sealed this 13th day of November, A. D. 1945.

(Seal)

Leslie Frazer
First Assistant Commissioner of Patents.

occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch.

23. In an aircraft, an autorotatable sustaining rotor comprising a generally upright hub structure and a plurality of sustaining blades positioned to rotate about the axis of the hub, mechanism for mounting the blades on the hub structure including means providing for swinging movements of the blades generally transverse their rotative path of travel to accommodate differential flight forces and means providing for variation of the effective geometrical pitch angle of the blades throughout the length thereof, a pilot's control member movable with respect to the aircraft in at least one direction, connections between said member and the rotor adapted to controllably vary the pitch angle of the blades, said connections being so coupled that the maximum pitch variation of the blades occurs when their longitudinal axes are in a plane substantially at right angles to the direction of movement of the control member and the maximum increase of pitch being effected at a position approximately 90° past the position to which said control member is moved, considered with respect to the direction of rotation of the rotor, and the maximum decrease of pitch occurring at a point substantially diametrically opposite the maximum increase of pitch, and means for simultaneously varying the effective geometrical pitch angle of all of the blades in the same sense.

24. In an aircraft, a sustaining rotor including a generally vertical axis structure and sustaining blades articulated to the axis structure for swinging movements relatively thereto in generally vertical planes, means for varying the amplitude in an azimuth generally transverse of the aircraft of a periodic change of geometrical pitch angle of the rotor blades, a pilot's hand control member operative on said means and a pilot's foot pedal also operative on said means, depression of the pedal causing the pitch angle of the advancing rotor blades to increase and of the retreating blades to decrease.

25. In an aircraft, a sustaining rotor including a hub member rotatable about a generally vertical axis and radially disposed sustaining wings, means articulating the wings to the hub member for swinging movements relatively thereto, means operative on said rotor and controllable in flight to vary in at least one azimuth the inclination with reference to the aircraft of a plane substantially containing the path swept by the outer extremities of the sustaining wings, means for varying the average geometrical pitch angle of the sustaining wings, the structure of said three means being such as to provide for free operation of each of such means without appreciably disturbing the functioning of the others, and the craft further including an engine for forward propulsion, and power transmission means connecting said engine with the rotor for rotor-starting purposes, said transmission means including a controllable coupling, and means interconnecting the controllable coupling and the control for varying the path swept by the extremities of the wings constructed and arranged so that the coupling is automatically disengaged except when the said control is displaced forwardly to a position beyond the normal flying range.

JUAN DE LA CIERVA.

CERTIFICATE OF CORRECTION.

Patent No. 2,380,582.                                         July 31, 1945.

JUAN de la CIERVA.

It is hereby certified that error appears in the printed specification of the above numbered patent requiring correction as follows: Page 3, second column, line 67, for the words "described, or either" read --illustrated or described--; and page 5, first column, line 67, for "spring 19a" read --spring 91a--; and that the said Letters Patent should be read with this correction therein that the same may conform to the record of the case in the Patent Office.

Signed and sealed this 13th day of November, A. D. 1945.

(Seal)                                       Leslie Frazer
                                             First Assistant Commissioner of Patents.